United States Patent [19]

Rohani et al.

[11] Patent Number: 6,064,659

[45] Date of Patent: May 16, 2000

[54] METHOD AND SYSTEM FOR ALLOCATING TRANSMIT POWER TO SUBSCRIBER UNITS IN A WIRELESS COMMUNICATIONS SYSTEM

[75] Inventors: Kamyar Rohani, Grapevine; Mansoor Ahmed, Haltom City, both of Tex.

[73] Assignee: Motorola, Inc., Schaumburg, Ill.

[21] Appl. No.: 09/113,391

[22] Filed: Jul. 10, 1998

[51] Int. Cl.[7] ........................................ H04B 7/00
[52] U.S. Cl. .......................... 370/318; 455/13.4; 455/522
[58] Field of Search ........................... 370/318; 455/13.4, 455/522

[56] References Cited

U.S. PATENT DOCUMENTS 5,794,129  8/1998  Komatsu ............................... 455/69

*Primary Examiner*—Melvin Marcelo
*Attorney, Agent, or Firm*—L. Bruce Terry

[57] ABSTRACT

In a transceiver in a wireless communications system, data is transmitted from the transceiver to subscriber units, wherein each subscriber unit has a requested transmit power and an allocated transmit power, and wherein the allocated transmit power is based upon the requested transmit power. A request for an additional power allocation is detected, wherein such additional allocation causes a total requested power to exceed a maximum transceiver power. In response, allocated transmit power is limited for a minimum number of selected subscriber units needed to reduce a total transceiver transmit power below the maximum transceiver power.

14 Claims, 5 Drawing Sheets

METHOD AND SYSTEM FOR ALLOCATING TRANSMIT POWER TO SUBSCRIBER UNITS IN A WIRELESS COMMUNICATIONS SYSTEM

FIELD OF THE INVENTION

The present invention is related in general to wireless communications systems, and more particularly to an improved method and system for allocating and limiting transmit power in a transceiver for transmitting to subscriber units in a wireless communications system.

BACKGROUND OF THE INVENTION

In a typical wireless communications system, a base transceiver is used to transmit and receive radio frequency communication signals to and from subscriber units located randomly over a wireless communications system coverage area. In order to maintain a reliable communications link with each subscriber unit, the transceiver may transmit a composite signal having a different amount of power individually selected for each subscriber unit. For example, with reference to FIG. 1, wireless communications system service area 50 may include a base station or transceiver 52 that serves a plurality of subscriber units 54–62. Some of these subscriber units may be communicating voice data, or other real-time data, as illustrated by subscriber units 54, 56, and 60, while other subscriber units may be communicating non-real-time data, as illustrated by subscriber units 58 and 62. As used herein, "real-time data" may be defined as data that requires a guaranteed time of arrival, or data that may not be useful if it has been delayed by more than a predetermined amount of time. Real-time data may include digitized voice, video data, data from sensors used to control operations in real-time, and other similar data. Non-real-time data may include data from the internet that represents web pages or other files transferred during a file transfer protocol (FTP) session, audio or video data intended for play back once an entire file has been transferred, and other similar data.

As shown in FIG. 1, subscribers 54–62 may each require a different transmit power, where such power is allocated at transceiver 52. One of the factors that influences the power allocated to a subscriber unit is the distance from transceiver 52. As shown in FIG. 1, the power allocated to subscriber unit 54 would typically be less than the power allocated to subscriber unit 60, which is on the edge of wireless communications system service area 50. And compared to one another, subscriber unit 62 will be allocated more power than subscriber unit 58 because of the difference in distance to transceiver 52.

Another factor that influences the amount of power allocated to a subscriber unit is the presence of an attenuating object in a propagation path between the subscriber unit and the transceiver. For example, in FIG. 1, building 64 lies between subscriber unit 56 and transceiver 52. Building 64 attenuates the signal such that transceiver 52 must allocate more power to subscriber 56 in order to insure reliable communication.

A third factor that influences the power allocated is the data rate of the communications link. Generally, subscriber units in a voice call require less power allocation than subscriber units receiving non-real-time data. This is because the non-real-time data is preferably transmitted at a much higher data rate, and therefore needs a higher power allocation to maintain the required energy per bit at the receiving subscriber unit. A typical bit rate for a voice call is 4 Kbps while a bit rate for a non-real-time data call may be 64 Kbps.

In a communications system where the number of subscriber units is variable, and the distance from the transmitter is variable, and the type of data and location of attenuating objects is variable, a transceiver may in some instances be asked to transmit more power than it is capable of transmitting. Thus, each transceiver has a maximum transceiver power, which should not be exceeded. In the prior art, transmitting above the maximum transceiver power was avoided by limiting the number of subscriber units simultaneously served by the transceiver. This limit on the number of users, coupled with the selection of a larger power amplifier, provided a design margin and a statistical expectation that the maximum transceiver power would not be exceeded. This solution is not optimal because the design margin is capacity that could be used to make money for the system operator without damaging the transceiver.

Other methods of protecting the transceiver include measuring the temperature of temperature sensitive components in the transceiver and shutting down the transceiver if these components exceed a maximum temperature. The solution is undesirable because many calls may be dropped and subscribers frustrated while the transceiver cools and returns to a safe operating temperature.

Therefore, it should be apparent to those skilled in the art that a need exists for an improved method and system for allocating transmit power in a transceiver that serves multiple subscriber units in a wireless communications system, wherein the power allocation scheme protects the transceiver while preserving as much subscriber service as limits will allow.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 2:
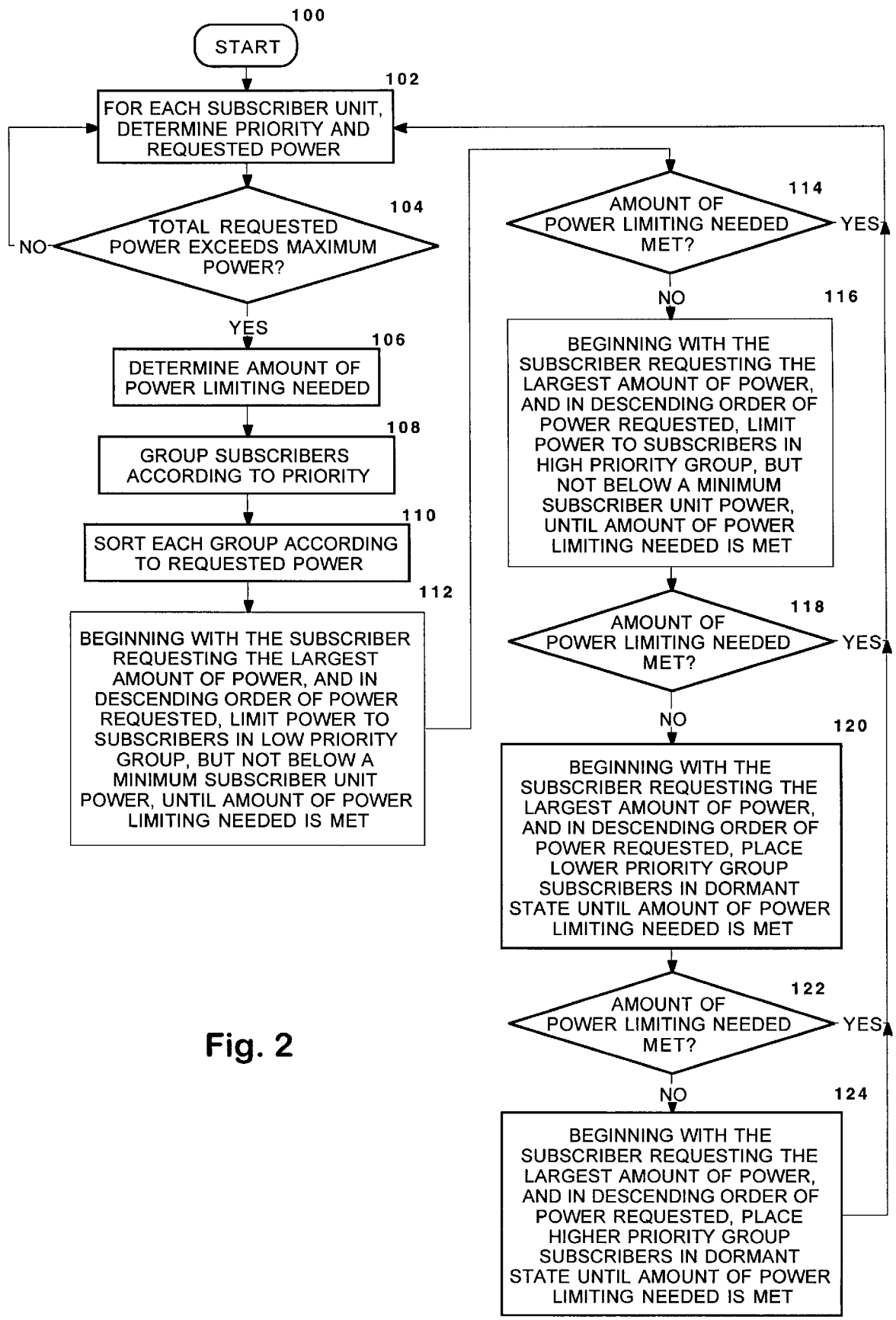
FIG. 2 is a high-level logical flowchart that illustrates the operation of the method and system of the present invention.

Referring now to FIG. 2, there is depicted a high-level logical flowchart that illustrates the operation of the method and system of the present invention. As illustrated in the embodiment shown, the process begins at block 100 and thereafter passes to block 102 wherein the process determines for each subscriber unit a priority and a requested power. A subscriber unit's priority may be based upon one or more factors, such as whether or not the subscriber unit is set to receive real-time or non-real-time data, a level of service that the user has contracted for with the system operator, whether or not the subscriber unit is operating in an emergency situation, and other similar factors. A wireless communications system may be designed for two or more priority levels.

A subscriber unit's requested power may be determined by a direct request from the subscriber unit, or may be indirectly determined by examining metrics such as a frame erasure rate (FER).

Next, the process determines whether or not the total requested power exceeds a maximum transceiver power, as illustrated at block 104. The total requested power is the total of all power requested by each subscriber unit served by the transceiver. The maximum transceiver power is the maximum power that the transceiver can safely transmit without damaging circuitry or causing other problems. If the total requested power does not exceed the maximum transceiver power, the process iteratively returns to block 102 to monitor for an overpower condition.

After determining that the total requested power exceeds the maximum transceiver power, the process determines an amount of power limiting that is needed to reduce the total transceiver transmit power below the maximum transceiver power, as depicted at block 106.

Next, the process groups the subscriber units according to subscriber unit priority, as illustrated at block 108. Thereafter, the process sorts each priority group according to the amount of requested transmit power from each subscriber unit in the group, as depicted at block 110.

After determining an amount of limiting needed, separating the subscribers into priority groups, and sorting each group according to requested power, the process can select one or more subscriber units that will have their allocated power limited. As illustrated at block 112, the process first selects the subscriber in the lowest priority group who is requesting the largest amount of power. This subscriber is limited to the extent that the amount of power limiting needed is met, or until a minimum subscriber unit power is reached for that subscriber unit. If more than one subscriber unit must be limited to meet the amount of power limiting needed, the second largest power requesting subscriber unit in the group is limited until the total transceiver transmit power is below the maximum transceiver power, or until that subscriber unit is limited to a minimum subscriber unit power. This process of limiting continues in descending order of power requested until the amount of power limiting needed has been satisfied or until all the subscriber units in the lowest priority group have been limited to a minimum subscriber unit power.

Note that a minimum subscriber unit power is preferably a power at which data is still being transferred at a minimum bit rate, which ensures that the call or data session continues without being dropped. Furthermore, such a minimum bit rate may be initiated as the result of reducing the power allocated to the subscriber unit. For example, as a subscriber unit's power begins to drop below a requested power, the subscriber unit may tolerate a higher error rate. As the error rate continues to increase, it may reach a point where the subscriber unit and the transceiver agree to communicate at a lower bit rate. This increases the reliability of the link because the bit time increases, thereby increasing the amount of energy per bit.

Next, the process then determines whether or not the amount of power limiting needed has been met by limiting one or more subscriber units in the lowest priority group, as depicted at block 114. If the amount of power limiting has been met, the process returns to block 102 to determine whether or not additional power limiting is needed as a result of a subsequent power increase request. If the amount of power limiting needed is not met at block 114, the process begins limiting power to subscribers in the higher priority group in a manner similar to that discussed with respect to block 112. Thus, as illustrated at block 116, a minimum number of the largest power users in the higher priority group are limited to a power not below a minimum subscriber unit power until a number of subscriber units has been limited to reduce a total transceiver transmit power below the maximum transceiver power.

If after limiting all subscriber units in all priority groups, the amount of power limiting needed has still not been met, the process continues by sequentially placing subscriber units in the lowest priority group in a dormant state beginning with the subscriber requesting the largest amount of power until the amount of power limiting needed is met, as illustrated at blocks 118 and 120. If after placing the lowest priority subscribers in a dormant state the amount of power limiting is still not met, the process places the necessary number of high priority subscribers in a dormant state until the amount of power limiting needed is met, as depicted at blocks 122 and 124. Following block 124, the process returns to block 102.

Although it is not shown in FIG. 2, as subscriber units request less power, or as subscriber units complete their calls, power allocated to subscriber units may be increased so that eventually all subscriber units may be allocated an amount of power that they have requested. Thus, when power becomes available, and additional capacity becomes available, power limiting is eliminated because it is no longer needed.

Figure 1:
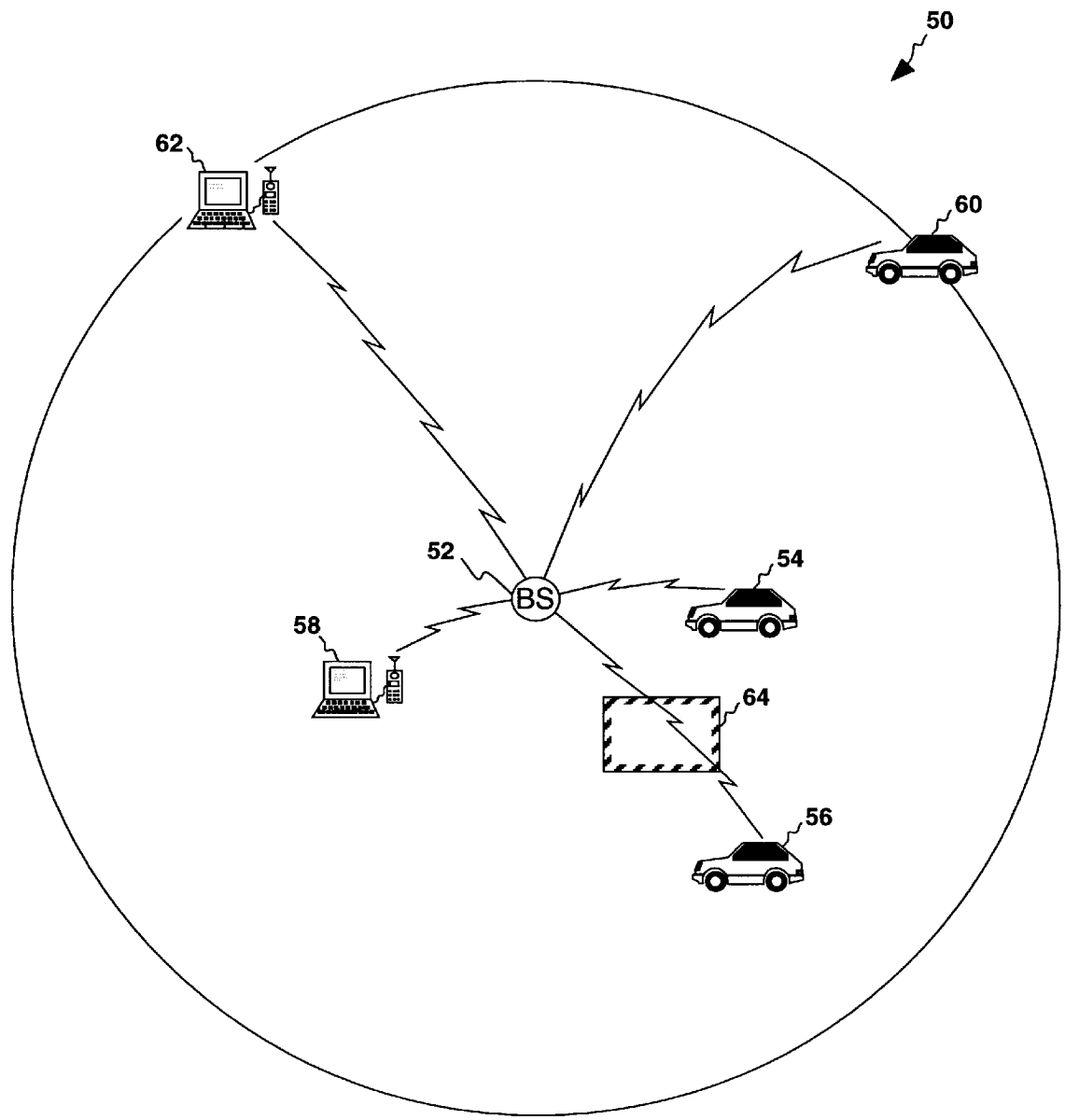
FIG. 1 depicts a wireless communications system service area with a transceiver serving multiple subscriber units.
Figure 3:
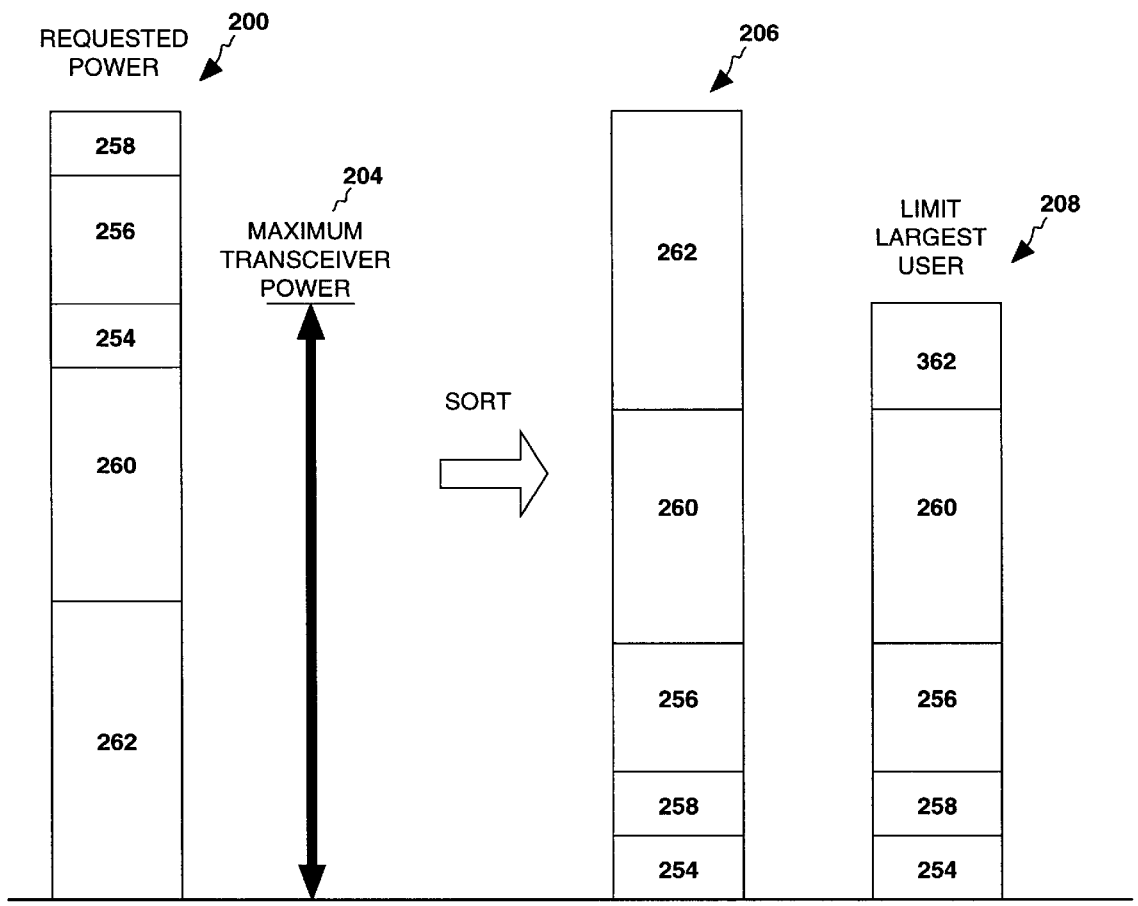
FIGS. 3 and 4 further illustrate the operation of the method and system of the present invention in two different circumstances.

With reference now to FIG. 3, the process shown in the flowchart of FIG. 2 is further illustrated. As discussed with reference to block 102 in FIG. 2, the process first determines for each subscriber unit an amount of requested power. This is shown graphically at reference numeral 200, wherein the amounts of power requested by subscriber units 54–62 (see FIG. 1) are shown with corresponding reference numerals 254–262. As one might expect from examining FIG. 1, subscriber unit 54 is requesting the least amount of power as shown at reference numeral 254 in FIG. 3, while subscriber unit 62 is requesting the largest amount of power, as indicated at reference numeral 262 in FIG. 3.

Once the power requested by each subscriber is determined, a total power requested may be computed by summing all the requested power. This value is then compared to a maximum transceiver power 204, as shown graphically in FIG. 3. If this total requested amount of power exceeds the maximum transceiver power 204 the process sorts the subscriber units according to the amount of requested transmit power, as shown at reference numeral 206.

Next, allocated transmit power for a minimum number of selected subscriber units is limited by a level needed to reduce a total transceiver transmit power below the maximum transceiver power 204. This is illustrated at reference numeral 208, wherein the power requested by subscriber unit 62 has been limited to the allocated power shown at reference numeral 362.

Figure 4:
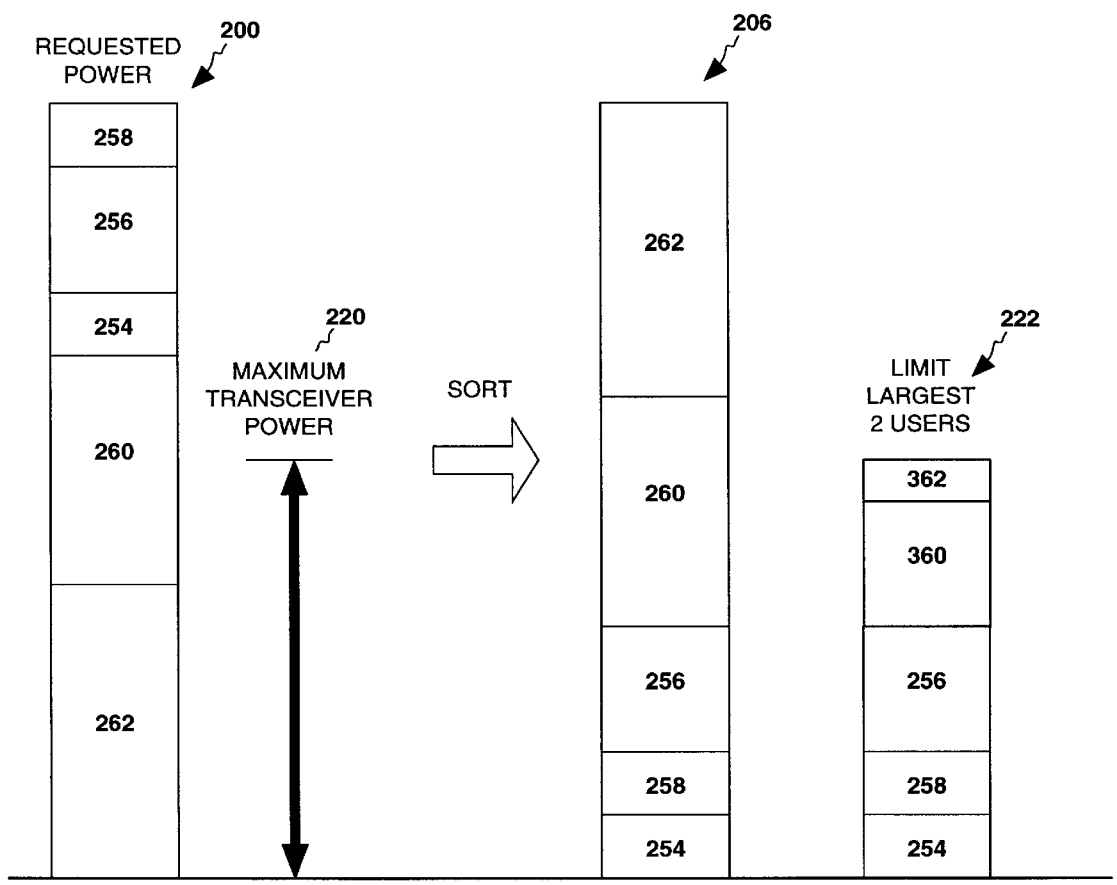

In the example shown in FIG. 3, a single subscriber unit was limited to reduce the total transmit power below the maximum transceiver power. As a further example of the operation of the present invention, FIG. 4 illustrates the situation in which two subscriber units are limited, as shown at reference numerals 362 and 360. Notice that in FIG. 4 maximum transceiver power 220 is so low that the amount of power limiting needed may not be met by limiting only the power to subscriber unit 62. In this example, the power allocated to subscriber unit 62 has been limited to a minimum subscriber unit power, which is enough power to keep the call to subscriber unit 62 active. The remaining amount of power limiting needed is taken from the power allocated to subscriber unit 60, as shown at reference numeral 360.

From examining the flowchart of FIG. 2, and the illustrations in FIGS. 3 and 4, it should be understood that in a preferred embodiment, the subscriber units requesting the largest amount of transceiver power are limited first so as to limit a minimum number of subscriber units needed to reduce a total transceiver transmit power below the maximum transceiver power. The reason for this is to adversely affect the fewest number of subscriber units while still limiting the amount of allocated power by the amount needed. Such adverse affects on the subscribers include delay in receiving data frames or degraded communications performance due to the lack of power requested.

Figure 5:
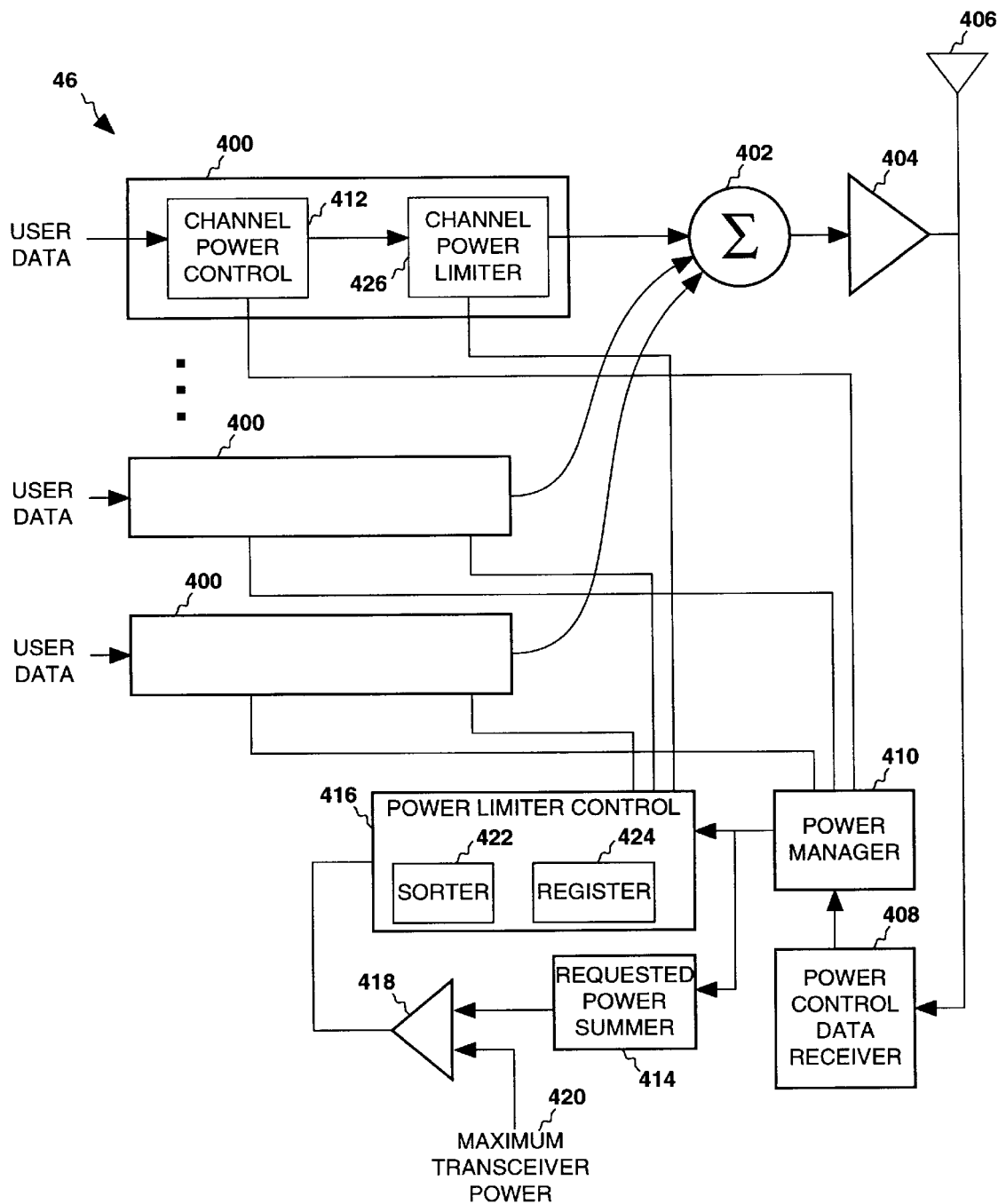
FIG. 5 is a transceiver according to the method and system of present invention.

With reference now to FIG. 5, there is depicted a transceiver that may be used to implement the method and system of the present invention. As shown, transceiver 46 includes a plurality of channel processors 400 for receiving user data, and formatting and modulating such data for transmission to the subscriber units.

The outputs of channel processors 400 are summed at summer 402. Following summer 402 the composite data, which includes data from all subscribers, is upconverted, modulated, and amplified in radio frequency transmitter 404. The output of radio frequency transmitter 404 is coupled to antenna 406.

Also coupled to antenna 406 is power control data receiver 408, which is used to receive data from subscriber units, wherein such data is used to allocate power in transceiver 46. In some systems, such data may include a periodic stream of bits that direct transceiver 46 to increase or decrease power allocated to a particular subscriber unit by a preset amount. Alternatively, subscriber units may request an absolute power setting, or may request an increase or decrease of a particular amount.

The output of power control data receiver 408 is coupled to power manager 410, which is used to keep track of and update the power requested by each subscriber unit.

Outputs from power manager 410 are coupled to channel power controls 412, which are located in each channel processor 400. Such channel power controls 412 may be used to scale the user data in accordance with the power that has been allocated to the particular subscriber unit.

Power manager 410 is also coupled to requested power summer 414 and power limiter control 416. Data transferred to these two functions by power manager 410 includes data representing the requested power of each subscriber unit. The function of requested power summer 414 is to add all requested power allocations and output a total requested power for all subscriber units served by transceiver 46. Such output is coupled to comparator 418 which computes the difference between the total requested power and maximum transceiver power 420. Maximum transceiver power 420 may be a preset value, or may be computed based upon other critical values measured in transceiver 46. For example, maximum transceiver power 420 may be computed from temperatures measured in the amplifier in radio frequency transmitter 404.

Thus, the output of comparator 418 represents an amount of power that must be limited in order to protect components in radio frequency transmitter 404. This value is coupled to power limiter control 416, which is responsible for selecting subscriber units that will have their power limited in order to reduce the total transceiver transmit power below the maximum transceiver power.

In a preferred embodiment, power limiter control 416 includes sorter 422 and minimum allocated transmit power register 424. Sorter 422 is used to sort the list of requested powers so that the subscriber units requesting the largest amounts of power may be quickly identified. Minimum allocated transmit power register 424 may be used to store a variable representing a power level beyond which the subscriber unit will not be limited. This minimum allocated transmit power value is selected to maintain some data transfer between the transceiver and the subscriber unit, or, alternatively, to a level that avoids dropping the call. In some embodiments, however, the minimum allocated transmit power may be set to zero.

Outputs of power limiter control 416 are coupled to channel power limiters 426 in each channel processor 400. The purpose of channel power limiter 426 is to reduce the power of the user data signal before the user data signal is sent to summer 402.

As should be apparent to those persons skilled in the art, the present invention may be used in a multi-carrier code division multiple access (CDMA) system. In such multi-carrier systems, the data transmitted to a subscriber unit is simultaneously transmitted on multiple carrier frequencies and the subscriber unit receives all of such frequencies in order to collect and demodulate the data. Therefore, in the multi-carrier system each of the transceivers used for the multiple carrier frequencies may be independently protected by the method and system of the invention. Thus, if some carrier frequencies include subscriber units that use only one carrier of the multiple carriers used by multi-carrier subscriber units, the limiting on that one carrier may be different than the limiting required on the other remaining carriers.

After reading the description above, it should be apparent that the present invention protects sensitive circuitry in the transceiver while simultaneously increasing the capacity of the wireless communications system. This is effectively accomplished by substantially reducing the design margin used in the prior art to protect the transceiver and using the capacity contained in this design margin to serve additional users or to increase capacity.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a transceiver for allocating transmit power to subscriber units in a wireless communications system, the method comprising the steps of:

transmitting data from the transceiver to subscriber units, wherein each subscriber unit has a requested transmit power and an allocated transmit power, wherein the allocated transmit power is based upon the requested transmit power;

detecting a request for an additional power allocation that causes a total requested power to exceed a maximum transceiver power;

determining a minimum number of subscriber units that can have allocated transmit power limited by an aggregate amount necessary to reduce a total transceiver transmit power below the maximum transceiver power;

in response to the minimum number of subscriber units, selecting subscriber units for limiting allocated transmit power; and limiting allocated transmit power for the selected subscriber units by amounts needed to reduce the total transceiver transmit power below the maximum transceiver power.

2. The method for allocating transmit power according to claim 1 wherein each selected subscriber unit is a subscriber unit that is not receiving real-time data.

3. The method for allocating transmit power according to claim 1 wherein each selected subscriber unit is a subscriber unit that is a low priority user.

4. The method for allocating transmit power according to claim 1 wherein each selected subscriber unit has a requested transmit power at least as large as each subscriber unit that was not selected.

5. The method for allocating transmit power according to claim 1 wherein the step of detecting a request for an additional power allocation that causes a total requested power to exceed a maximum transceiver power further includes detecting a request from a new subscriber unit for an additional power allocation that causes a total requested power to exceed a maximum transceiver power.

6. The method for allocating transmit power according to claim 1 wherein the limiting step further includes limiting allocated transmit power for the selected subscriber units by amounts needed to reduce the total transceiver transmit power below the maximum transceiver power, wherein each selected subscriber unit is not limited below a minimum allocated transmit power.

7. The method for allocating transmit power according to claim 1 further including the steps of:

sorting the subscriber units according to requested transmit power; and selecting the selected subscriber units in order beginning with the subscriber unit requesting the largest transmit power.

8. A transceiver for allocating transmit power to subscriber units in a wireless communications system comprising:

means for transmitting data from the transceiver to subscriber units, wherein each subscriber unit has a requested transmit power and an allocated transmit power, wherein the allocated transmit power is based upon the requested transmit power;

means for detecting a request for an additional power allocation that causes a total requested power to exceed a maximum transceiver power;

means for determining a minimum number of subscriber units that can have allocated transmit power limited by an aggregate amount necessary to reduce a total transceiver transmit power below the maximum transceiver power;

means for selecting subscriber units for limiting allocated transmit power in response to the minimum number of subscriber units; and means for limiting allocated transmit power for the selected subscriber units by amounts needed to reduce the total transceiver transmit power below the maximum transceiver power.

9. The transceiver for allocating transmit power according to claim 8 wherein each selected subscriber unit is a subscriber unit that is not receiving real-time data.

10. The transceiver for allocating transmit power according to claim 8 wherein each selected subscriber unit is a subscriber unit that is a low priority user.

11. The transceiver for allocating transmit power according to claim 8 wherein each selected subscriber unit has a requested transmit power at least as large as each subscriber unit that was not selected.

12. The transceiver for allocating transmit power according to claim 8 wherein the means for detecting a request for an additional power allocation that causes a total requested power to exceed a maximum transceiver power further includes means for detecting a request from a new subscriber unit for an additional power allocation that causes a total requested power to exceed a maximum transceiver power.

13. The transceiver for allocating transmit power according to claim 8 wherein the means for limiting further includes means for limiting allocated transmit power for the selected subscriber units by amounts needed to reduce the total transceiver transmit power below the maximum transceiver power, wherein each selected subscriber unit is not limited below a minimum allocated transmit power.

14. The transceiver for allocating transmit power according to claim 8 further comprising:

means for sorting the subscriber units according to requested transmit power; and means for selecting the selected subscriber units in order beginning with the subscriber unit requesting the largest transmit power.

* * * * *